United States Patent
Crenshaw

(10) Patent No.: US 6,802,909 B1
(45) Date of Patent: Oct. 12, 2004

(54) METHOD FOR IMPROVING THE OPERATION OF A PIPELINE BY EMPLOYING SOAP PIGS

(76) Inventor: Doyle J. Crenshaw, 91 Oakridge Dr., Booneville, AR (US) 72927

( * ) Notice: Subject to any disclaimer, the term of this patent is extended or adjusted under 35 U.S.C. 154(b) by 0 days.

(21) Appl. No.: 10/422,241

(22) Filed: Apr. 24, 2003

(51) Int. Cl.[7] .............................. B08B 9/027; B08B 9/04
(52) U.S. Cl. .......................... 134/8; 134/9; 134/22.11; 134/22.12; 134/22.14; 134/22.18; 134/22.19
(58) Field of Search .............................. 134/8, 9, 22.11, 134/22.12, 22.14, 22.18, 22.19

(56) References Cited

U.S. PATENT DOCUMENTS

| | | | |
|---|---|---|---|
| 3,063,079 A | 11/1962 | Bergman et al. | 15/104.06 |
| 3,972,823 A | 8/1976 | Howarth | 252/132 |
| 4,079,015 A | 3/1978 | Paucot et al. | 252/95 |
| 4,373,225 A | 2/1983 | v. Eckardstein et al. | 15/104.06 |
| 4,607,410 A | 8/1986 | Bersch | 15/3.51 |
| 4,793,016 A | 12/1988 | Valentine et al. | 15/104.062 |
| 5,072,476 A | 12/1991 | Bersch | 15/3.51 |
| 5,088,517 A | 2/1992 | Bersch | 137/101.11 |
| 5,095,572 A | 3/1992 | Wagner | 15/3.51 |
| 5,208,937 A | 5/1993 | Cooper | 15/104.062 |
| 5,957,675 A | 9/1999 | Buehrer et al. | 417/519 |
| 2001/0049345 A1 | 12/2001 | Mumoli | 510/151 |

*Primary Examiner*—Zeinab El-Arini
(74) *Attorney, Agent, or Firm*—Gable & Gotwals; Paul H. Johnson

(57) ABSTRACT

A method of improving the operation of a gas pipeline having at least some water therein including the steps of introducing into the interior of the pipeline a soluble soap pig that is dimensioned to move through the pipeline by gas flow, the composition of the soap pig being selected such that at least some soap is applied as a film to the interior wall as the soap pig moves through the pipeline and in which the soap pig slowly dissolves within the pipeline. The soap film preferably has anti-corrosive and/or antibacterial properties.

11 Claims, 1 Drawing Sheet

Fig. 3
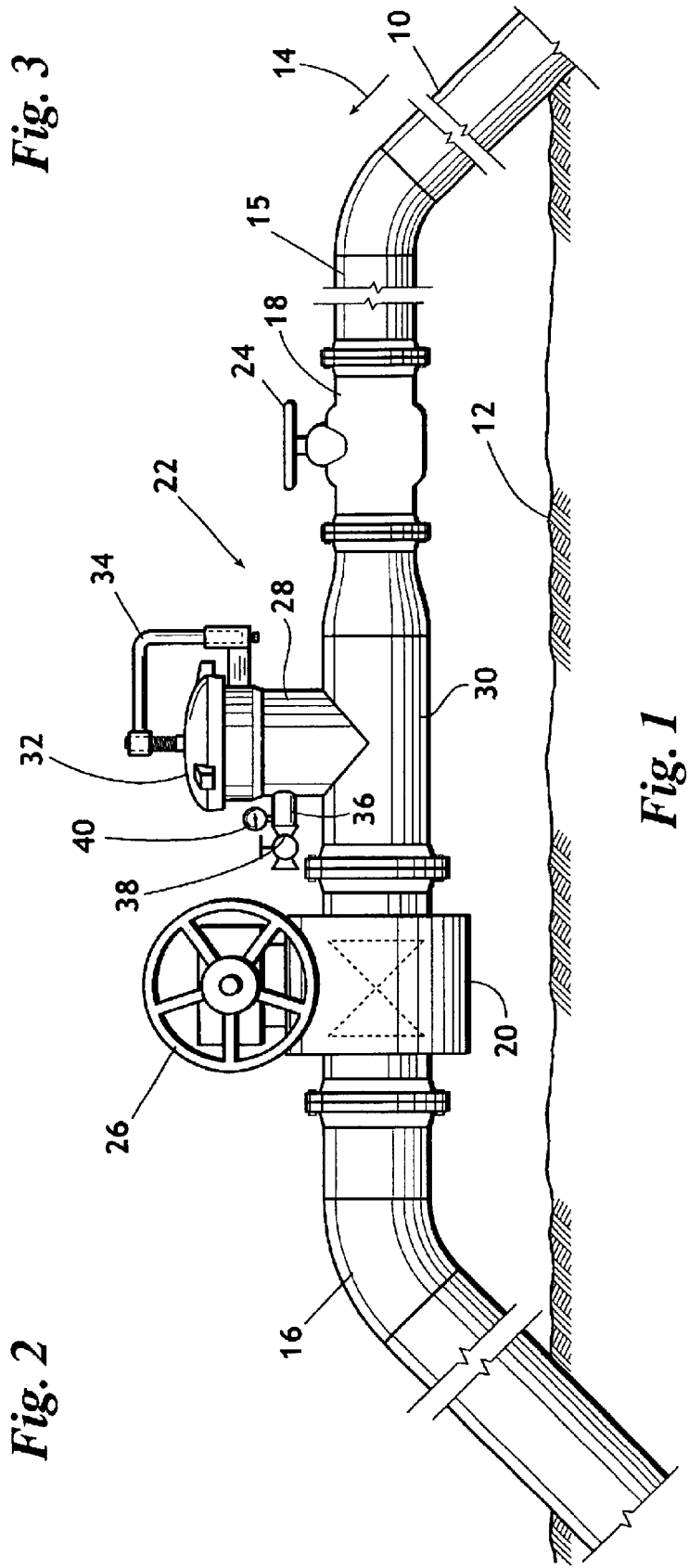
Fig. 2
Fig. 1

METHOD FOR IMPROVING THE
OPERATION OF A PIPELINE BY
EMPLOYING SOAP PIGS

REFERENCE TO PENDING APPLICATIONS

This application is not based upon any pending domestic or international patent applications.

REFERENCE TO MICROFICHE APPENDIX

This application is not referenced in any microfiche appendix.

BACKGROUND OF THE INVENTION

Many thousands of miles of pipeline operated in the United States and other countries of the world transport gas and particularly natural gas for use as fuel for heating homes, offices, factory buildings and other applications. Further, gas is a common fuel employed for industrial applications including for use in generating electrical energy and in the chemical manufacturing industry. A natural gas pipeline typically carries with it some water. Water can occur as a result of condensation. Further, natural gas when produced from a well borehole typically has some water entrained therein. Separators are used to extract most of the water, but inevitably some remains.

Water is deleterious to a gas pipeline. Water accumulation in a portion of a pipeline, can reduce the effective cross-sectional area of the pipeline and therefore impede flow rates through the pipeline. Further, water in a pipeline can result in corrosion.

In addition, water promotes biological growths on the interior walls of pipelines.

For these and other reasons, good pipeline maintenance requires that water accumulation be kept to a minimum. Further, for long, trouble-free life of a pipeline it is beneficial to periodically treat the wall of the pipeline to inhibit corrosion as well as reducing the potential for bacteria growth. For these reasons, the invention herein provides a method of improving the operation of a pipeline having gas flow therein that has some water component in which the method includes the use of soluble soap pigs that are dimensioned and configured to move through a pipeline by the force of gas flow. For background information relating to methods for improving the maintenance and operation of pipelines reference may be had to the following previously issued United States Patents:

| U.S. Pat. No. | U.S. patent application Pub. No. | INVENTOR | TITLE |
| --- | --- | --- | --- |
| | 2001/0049345 A1 | Mumoli | Single-Dose Soap Unit and Method |
| 3,063,079 | | Bergman et al. | Combination Valve and Cleaning Ball Launcher For Use In Pressure Flow Lines |
| 3,972,823 | | Howarth | Soap Compositions for Non-Gelling Soap Solution |
| 4,079,015 | | Paucot et al. | Liquid Detergent Compositions |

-continued

| U.S. Pat. No. | U.S. patent application Pub. No. | INVENTOR | TITLE |
| --- | --- | --- | --- |
| 4,373,225 | | Eckardstein et al. | Piping Valve With A Housing For The Transfer Of A Wiper Insertable In Conduits That Supply Pressurized Viscous Material, Preferably Concrete |
| 4,607,410 | | Bersch | Apparatus For Cleaning Pipelines For Beverages And The Like |
| 4,793,016 | | Valentine et al. | Conduit Cleaning Apparatus |
| 5,072,476 | | Bersch | Apparatus For Cleaning Pipelines For Beverages And The Like |
| 5,088,517 | | Bersch | Apparatus For Admitting Flowable Additive To A Liquid |
| 5,095,572 | | Wagner | Automated Cleaning Device For Beverage Drafting And Dispensing Systems |
| 5,208,937 | | Cooper | Apparatus For Launching Pigs Into Pipelines |
| 5,957,675 | | Buehrer et al. | Thick Matter Pump With A Cleaning Cartridge And Blocking Slide |

BRIEF SUMMARY OF THE INVENTION

The invention herein is a method of improving the operation of a pipeline having gas flow therethrough and in which some water occurs. In a gas pipeline water is harmful since it augments corrosion and bacteria growth and if accumulated in significant quantities can reduce gas flow through the pipeline.

The method of this invention includes introducing into the interior of a pipeline a soluble soap pig that is dimensioned to move through the pipeline by gas flow. The composition of a soap pig is selected so that a soap film is applied to the interior wall of the pipeline as the soap pig moves by the force of gas flow through the pipeline. Further, the dimension and composition of the soap pig is selected such that it slowly dissolves by the water component of the pipeline so that it is not necessary to recover the soap pig from the interior of the pipeline.

The soap pig may be formulated so that it is anti-corrosive, anti-bacterial or both.

A more complete understanding of the invention will be obtained from the following description and claims taken in conjunction with the attached drawings.

BRIEF DESCRIPTION OF THE DRAWINGS

FIG. 1 is an elevational external view of portions of a pipeline including provisions by which a soap pig may be introduced into the pipeline. The soap pig is moved by gas flow through the pipeline.

FIG. 2 is an external view of a spherical soap pig that may be employed in this invention.

FIG. 3 is an external view of a cylindrical soap pig of a type that may be employed in the invention.

DETAILED DESCRIPTION OF THE PREFERRED EMBODIMENTS

FIG. 1 illustrates a portion of a natural gas gathering pipeline having a meter run therein. Pipeline 10 is shown emerging from the earth's surface 12. The direction of gas flow through the pipeline is indicated by an arrow 14. A meter run 15 that typically includes a gas recorder (not shown) is connected downstream of pipeline 10. From meter run 15 the gas flows through a valve 18 and ultimately into a continuation 16 of the pipeline. Between valve 18 and the continuation 16 of the pipeline a soap ball launcher system is provided that will now be described.

The invention will be described as if it is employed specifically in a natural gas gathering pipeline. In such case, the pipeline extension 16 may extend to a compressor station or other facilities whereby the gas is transmitted over a distance, either long or short, to a place where the gas is used. For instance, the pipeline extension 16 may connect to an electric generating facility wherein natural gas is used as a fuel for generating electricity. Instead, pipeline extension 16 may connect to a distribution system that ultimately carries the gas to homes, businesses, schools, factories and so forth. Or, pipeline extension 16 may connect to a chemical manufacturing facility. In any event, the pipeline system (shown in FIG. 1, including pipeline 10 and pipeline extension 16) is representative of a part of a gathering system for natural gas.

Between meter run 15 and pipeline extension 16 there is a soap pig launching system that includes three basic portions—that is, the upstream valve 18; a downstream valve 20 and a soap pig launcher generally indicated by the numeral 22. Upstream valve 18 may be any type of valve commonly employed to control gas flow through a pipeline and includes a handle 24 which is representative of a means of opening and closing the valve. Handle 24 is representative of a manually, electrically or hydraulically operated system for selectively opening and closing gas flow through valve 22. In like manner, downstream valve 20 is representative of valves commonly employed in the pipeline industry for opening and closing gas flow through a pipeline and is illustrated to include a handle 26 which, like upstream valve handle 24, may be manually, electrically or hydraulically actuated.

Positioned between upstream and downstream valves 18 and 20 is a soap pig launcher that has an upwardly extending soap pig receiver 28 connected at its lower end with a horizontal tubular portion 30 of the soap pig launcher 22. Affixed to the upper end of soap pig receiver 28 is a removable cover 32. The removable cover 32 is illustrated to be of the type that includes a cover support arm 34 so that when cover 32 is detached from the upper end of soap pig receiver 28, it can be swung, by use of arm 34, to clear soap pig receiver 28 and permit a soap pig to be deposited therein. After a soap pig has been deposited within receiver 28, cover 32 is replaced and sealed against the upper end of the receiver.

Extending from soap pig receiver 28 is a short-length pipe 36 that has a small valve 38 at the outer end thereof. A gauge 40 extends from pipe 36.

The soap pig launcher 22 is configured to permit an operator to inject into pipeline extension 16 a soap pig. This is achieved by the following sequence: First, the operator closes upstream valve 18 and downstream valve 20. Next the operator opens a small valve 38 to relieve pressure of gas from within the soap pig launcher. After the pressure has been completely relieved, the operator can then remove cover 32 and swing it out of the way so the upper end of the soap pig receiver is clear. The operator may then insert a soap pig or pigs into the interior of receiver 28, each pig falling downwardly into horizontal tubular portion 30 of the soap pig launcher.

A typical soap pig is shown in FIG. 2 and identified by the numeral 42. Soap pig 42 is spherical—that is, a round, solid ball of soap. The diameter of the spherical soap pig 42 is preferably substantially equal to the internal diameter of the pipeline 16. When soap pig 42 is deposited within soap pig receiver 28, the operator can then rotate arm 34 to move cover 32 back over the top of receiver 28 and the cover is then sealably secured to the top end of the soap pig receiver. This can be accomplished by having an externally threaded upper end of the receiver 28 and internal threads in cover 32 so that the cover may simply be threaded into position and sealed. However, this is by way of example only as there are other means of removably securing a cover to the end of a tubular member that would function to practice the invention.

After cover 32 is sealably in position, the operator closes small valve 38 and opens downstream valve 20 and upstream valve 18. With valves 18 and 20 open, gas can freely flow from pipeline 10 to and through pipeline extension 16. The spherical soap pig 42 is moved out of horizontal tubular portion 30 and into pipeline extension 16 by gas flow. As the spherical soap pig 42 moves through the pipeline it moves entrapped water in the pipeline forwardly in the direction of the gas flow. The soap ball pig acts like a sponge. By emulsifying with water in the pipeline the accumulation of water is kept to a minimum thereby helping to prevent accumulated water from interfering with the operation of the pipeline.

Further, the soap pig 42 is preferably formed of a product that leaves a thin layer of soap—that is, a soap film on the interior wall of the pipeline 16 as the soap pig moves through it. It is not imperative that soap pig 42 coat the full 360° interior surface of the pipeline 16 as it moves through the pipeline—it is only important that it covers at least a portion of the surface. The interior portion of the pipeline that is missed by one soap pig will most likely be contacted by subsequent soap pigs so that ultimately at least a significant part of the interior wall of the pipeline 16 is coated by passage of a soap pig 42 as soap pigs are periodically launched into the pipeline.

The soap pig 42 is preferably composed of material that forms a protective, corrosion resistant coating or film on the pipeline interior wall. Further, soap pigs 42 may preferably be of the type that leaves an anti-bacterial coating on the interior of the pipeline.

The soap pig 42 is dimensioned and composed such that it ultimately completely dissolves as it passes through pipeline 16. Thus, it is not necessary to retrieve the soap pig 42 once it is launched into the pipeline. The use of structural pipeline pigs for cleaning, batching and inspection services is well known however these type pigs can be used only in systems that have both a pig launcher and a pig receiver. The system of this invention employs only a soap pig launcher and does not require a receiver. Therefore, the costs of installing facilities to practice the invention are substantially reduced compared to most systems that use pipeline pigs.

Soap pig 42 is preferably composed of chemical constituents that arc beneficial even without physically providing a film on the pipeline wall.

FIG. 3 is a small isometric view of an alternate geometrical arrangement of a soap pig. Instead of being spherical as in FIG. 2, FIG. 3 illustrates a cylindrical and somewhat elongated soap pig. This illustrates that the invention may be practiced with differently shaped soap pigs. A cylindrical soap pig would require a somewhat different launcher than that disclosed herein in which cylindrical pigs are inserted in a way so that they arc longitudinally aligned with the pipeline when they enter into the horizontal tubular portion 30. A system of this type is not illustrated herein since launchers for longitudinally shaped pigs are well known in the art. Thus, the invention herein is not limited to the use only of soap pigs having a spherical shape.

It is understood that the invention herein is not limited by the illustrated preferred means of practicing the invention since the invention can be practiced by utilizing mechanisms and systems that in physical appearance would be completely different from those illustrated in the drawings and described herein. Instead, it is to be understood that the invention is limited only by the scope of the attached claim or claims, including the full range of equivalency to which each element or step thereof is entitled.

What is claimed is:

1. A method of improving the operation of a gas pipeline that has at least some water component flowing therethrough, the pipeline having an interior with a surface of a given internal diameter comprising:

introducing into the interior of the pipeline a soluble soap pig that is dimensioned to move through the pipeline interior by gas flow to thereby move any entrapped water forwardly in the pipeline, the soap pig having a composition selected such that a protective soap film is applied to at least some of said interior surface of the pipeline as said soap pig moves by force of gas flow and said soap pig is slowly dissolved and the water component emulsified to help reduced the accumulation of water in the pipeline.

2. A method of improving the operation of a gas pipeline according to claim 1 wherein said soap pig has a composition that is at least in part, anti-bacterial.

3. A method of improving the operation of a gas pipeline according to claim 1 wherein said soap pig is substantially spherical.

4. A method of improving the operation of a gas pipeline according to claim 1 wherein said soap pig has a diameter substantially equal to said internal diameter of the pipeline.

5. A method of improving the operation of a gas pipeline according to claim 1 wherein said soap pig is substantially cylindrical and of diameter substantially equal to the internal diameter of the pipeline.

6. A method of improving the operation of a gas pipeline according to claim 1 wherein said soap pig is configured by dimension and composition to dissolve within the pipeline and whereby no provision is required for physically removing the soap pig from the pipeline interior.

7. A method of improving the operation of a gas pipeline according to claim 1 wherein the pipeline has an upstream and a downstream valve and a soap pig launcher therebetween into which said soap pig is placed, the soap ball launcher having closable communication with the pipeline.

8. A method of improving the operation of a gas pipeline according to claim 7 including further steps of closing said upstream and downstream valves followed by opening an access into said soap pig launcher into which said soap pig is placed, followed by the steps of closing said soap pig launcher and opening said upstream and downstream valves causing gas flow to carry said soap pig into the pipeline.

9. A method of improving the operation of a gas pipeline according to claim 8 in which said soap pig launcher has a vent valve and the method includes the steps of opening said vent valve after said upstream and downstream valves are closed and before said soap pig launcher is opened and subsequently closing said vent valve before said upstream and downstream valves are opened.

10. A method of improving the operation of a gas pipeline according to claim 1 wherein said soap pig is formed of biodegradable soap.

11. A method of improving the operation of a gas pipeline according to claim 1 wherein said soap pig is formed of soap that deposits an anticorrosive film on at least a portion of the interior surface of the pipeline.

* * * * *